United States Patent [19]

Virgilio

[11] 4,440,127
[45] Apr. 3, 1984

[54] ELECTRONIC CONTROL DEVICE FOR THE FUEL METERING SYSTEM OF AN INTERNAL COMBUSTION ENGINE

[75] Inventor: Gustav Virgilio, Winnenden, Fed. Rep. of Germany

[73] Assignee: Robert Bosch GmbH, Stuttgart, Fed. Rep. of Germany

[21] Appl. No.: 408,556

[22] Filed: Aug. 16, 1982

[30] Foreign Application Priority Data

Mar. 23, 1982 [DE] Fed. Rep. of Germany ....... 3210512

[51] Int. Cl.$^3$ ............................................... F02D 5/00
[52] U.S. Cl. ..................................... 123/325; 123/493
[58] Field of Search ............... 123/320, 325, 333, 493, 123/198 D, 198 DB, 340, 341, 513, 464, 480; 180/271, 282, 284

[56] References Cited

U.S. PATENT DOCUMENTS

| | | | |
|---|---|---|---|
| 3,463,130 | 8/1969 | Reichardt et al. ................... | 123/493 |
| 3,809,028 | 5/1974 | Luchaco .............................. | 123/493 |
| 4,237,830 | 12/1980 | Stivender ............................. | 123/493 |
| 4,250,829 | 2/1981 | Stephens, Jr. ................... | 123/198 D |
| 4,353,342 | 10/1982 | Sugasawa et al. ................. | 123/493 |
| 4,389,994 | 6/1983 | Denz et al. ...................... | 123/480 X |

Primary Examiner—William A. Cuchlinski, Jr.
Attorney, Agent, or Firm—Edwin E. Greigg

[57] ABSTRACT

In internal combustion engines with external ignition the fuel metering is often interrupted during overrun operation for the purpose of saving fuel. It is proposed to inhibit this blocking of the fuel supply in those cases where the danger of slipperiness because of ice or snow exists. This danger is addressed by means of the method of measuring and evaluation of the intake air temperature and/or the temperature in the vicinity of the motor vehicle. Besides the possibility of realizing the invention from the block switch diagram, it is also pointed out that the electronic control device in accordance with the present invention can also be implemented relatively easily within the confines of a computerized control of the fuel metering.

8 Claims, 2 Drawing Figures

ELECTRONIC CONTROL DEVICE FOR THE FUEL METERING SYSTEM OF AN INTERNAL COMBUSTION ENGINE

BACKGROUND OF THE INVENTION

The present invention is based on an electronic metering device and method for fuel metering in an internal combustion engine described hereinafter. A fuel injection device is known from German Pat. No. 1 526 503 (now U.S. Pat. No. 3,463,130) in which the fuel supply is interrupted during overrun operation. In order to obtain a quiet warm-up run of the internal combustion engine even during low temperature periods, this interruption of the fuel supply during overrun operation is only permissible above certain temperatures of the internal combustion engine. In this regard the switching device in accordance with the state of the art processes a signal relative to the temperature of the internal combustion engine.

During overrun operations a braking of the internal combustion engine is desired. With a snow and ice covered road surface, however, this braking effect has a disadvantage, since during the transition to and from the overrun operation a danger of skidding of the vehicle because of jumps in the torque is present, and therefore the driver may lose control.

OBJECT AND SUMMARY OF THE INVENTION

The electronic control device and method for fuel metering in an internal combustion engine with the characteristics of a temperature signal related to the intake air and an output signal of a temperature sensor located in the body of a vehicle assures that during adverse weather-related road conditions no jumps in the torque because of interruption in the fuel supply can occur during overrun operation and therefore the vehicle remains under control.

Further advantages of the present invention will be seen hereinafter in connection with the following description of two exemplary embodiments. It has been proven advantageous to have one of the signals for the possible interruption of the fuel supply during overrun operation consist of a temperature signal relating to the temperature of the aspirated air and/or the other to be a temperature signal gained in the area of the body of the vehicle, for instance in the area of the bumpers.

Finally it is advantageous to feed a warning device in the vicinity of the driver of the vehicle with this temperature signal.

The invention will be better understood and further objects and advantages thereof will become more apparent from the ensuing detailed description of preferred embodiments taken in conjunction with the drawings.

BRIEF DESCRIPTION OF THE DRAWINGS

Two exemplary embodiments of the present invention are shown in the drawings and are further described and explained in the following.

DESCRIPTION OF THE PREFERRED EMBODIMENTS

The exemplary embodiments relate to electronic control devices for the fuel injection system of an internal combustion engine with external ignition. It should be stressed that the present invention is completely independent of the type of fuel metering used, so that it can also be used with controlled carburetor operations.

The exemplary embodiments show block circuit diagrams for analog and for digital signal processing. Furthermore, the programming of a suitably working computer system will have no problems when based on the block wiring diagrams provided.

Figure 1:
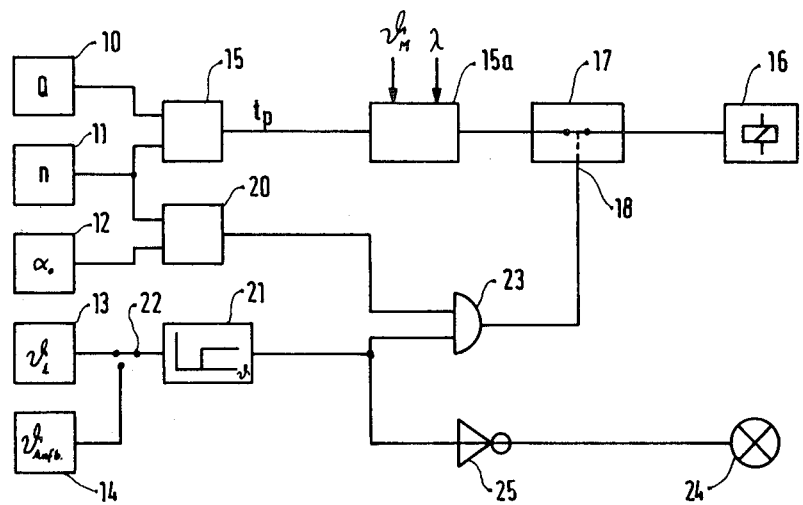
FIG. 1 shows a block circuit diagram of the electronic control device in accordance with the present invention, having the first type of temperature signal linkage.

FIG. 1 shows sensors for the air throughput in the intake manifold 10, for the rpm 11, for the throttle valve in zero position 12, for the air temperature in the intake manifold 13 as well as for a more external temperature sensor 14, for instance in the area of the front bumper. A timing element 15 receives signals from the air throughput and rpm sensors 10, 11 and provides on the output side a base injection signal of the duration $t_p$. A correcting step 15a follows for the adaptation of the base injection signal to, for instance, the temperature of the internal combustion engine as well as to desired lambda values. A normally closed switch 17 with a control input 18 is placed between this correcting step 15a and an injection valve 16. An overrun operation identification step is designated as 20. It processes signals from the rpm sensor 11 and the throttle valve position sensor 12. A threshold value switch is designated 21. It is coupled with the air temperature sensor 12 by way of a double-throw switch 22. An AND gate 23 receives output signals from the overrun operation identification step 20 and threshold value switch 21 and, on its output side, acts upon the control input 18 and the switch 17. Finally, a lamp 24 is connected to the output side of the threshold value switch 21. Switch 22 shows a possibility of either processing the temperature signal from intake air temperature sensor 13 or from external temperature sensor 14.

The basic method of the present invention is not to permit the interruption of the fuel supply during overrun operation during temperatures of the intake air or of the surroundings below predetermined values, since with these temperatures the danger of wintery road conditions can be present.

For this reason, in the apparatus according to FIG. 1, the threshold value switch is interrogated when either the signal in respect to the intake air temperature or the ambient temperature has reached a certain value. Only when this is the case, the switch 17 is opened by way of the AND gate 23 during overrun operation and thereby the transmission of injection impulses to the injection valve is blocked. Below the temperature values defined by the threshold value switch it is assumed that the danger of wintry road conditions exists and that for this reason jumps in the torque should be avoided. With temperatures below this value the output signal of the threshold value switch 21 is zero and thereby blocks the following AND gate 23, so that no impulse is transmitted to switch 17 which would cause it to open. At the same time warning lamp 24 is turned on and signals to the driver of the vehicle that there might be danger of road ice. In a particular vehicle an air temperature of $\leq 17°$ C. was measured in the air intake manifold behind the air volume meter, with an outside temperature below about $+3°$ C. The threshold value switch in the device of FIG. 1 therefore should, in this particular case, be adjusted to a signal value corresponding to 17° C.

Since for the correction of the amount of injection fuel the intake air temperature is also partially evaluated and analyzed, no special temperature sensor is needed in these cases in order to implement the present invention.

The double-throw switch 22 of FIG. 1 makes clear the alternate possibility to measure a temperature value outside of the vehicle, for instance, preferably in the area of the front bumper and to analyze this signal instead of the intake air temperature. Of course the threshold value of the threshold value switch 21 has to be newly determined.

Figure 2:
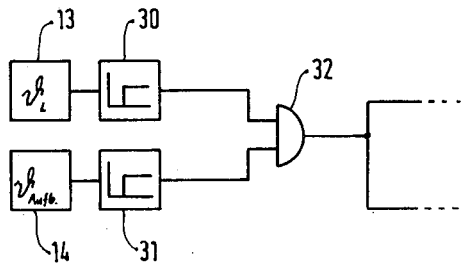
FIG. 2 shows a block circuit diagram having the second type of temperature signal linkage.

While the object of FIG. 1 shows the alternative possibilities by means of switch 22 for the evaluation and processing of separate temperature values, FIG. 2 shows a possibility of processing two separately evaluated values equally within the spirit of the invention. Both the temperature sensors 13 and 14 are each connected with threshold value switches 30 and 31 which react to temperature values set for special conditions. On their output side both threshold value switches 30 and 31 are linked with an AND gate 32 which, in turn, supplies the output line of the threshold value switch 21 of the object of FIG. 1. The main characteristic of the switching arrangement shown in FIG. 2 is the logical linking of two temperature threshold values. Therein the one referring to the intake air can be adjusted to, for instance, the temperature of 17° C. mentioned above, and the one referring to the external temperature to a value closely above the freezing point.

When correctly coordinating the temperature threshold values to be processed it has been shown that the object of the present invention can make a considerable contribution to vehicular safety, since it can differentiate, depending on the temperature, between the two desired goals of fuel economy and safe operation of the vehicle.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. An electronic control device for the fuel metering system of an internal combustion engine for use with a vehicle comprising, a switching means for suppressing the fuel supply during overrun operations of said engine, a processed temperature signal means responsive to at least one of an intake air temperature sensor means for said engine and to the output signal of an ambient air temperature sensor means located in the body of said vehicle for detecting the formation of ice exterior to said vehicle, and said switching means being responsive to said temperature signal means.

2. A control device in accordance with claim 1, wherein said temperature sensor means is disposed in the vicinity of the bumper of said vehicle.

3. A control device in accordance with claim 1 or 2, further comprising, an indicating means responsive to at least a part of said processed temperature signal means and disposed in the vicinity of the driver of said vehicle.

4. A control device in accordance with claim 1, further comprising, a threshold value switch means, at least a part of said temperature signal supplied to said threshold value switch means, a logic gate connected to the output of said threshold value switch means and to an overrun operation identification step means, whereby in the case of low temperature values during overrun operations the fuel metering signals are not suppressed by said switching means.

5. A control device in accordance with claim 1 further comprising, a threshold value switching means responsive to both said temperature sensor means for processing more than one temperature value.

6. An electronic control device in accordance with claim 4, wherein said switching means comprises a computer program means for inhibiting a blocking of the fuel supply during low temperatures of an overrun operation.

7. A method for fuel metering in an internal combustion engine comprising the steps of, sensing the temperature of the intake air for said engine as part of a processed temperature signal, sensing the temperature of the ambient air as another part of a processed temperature signal, providing fuel metering signals for suppressing the fuel supply to said engine, and inhibiting said fuel metering signals in response to at least one of said parts of said processed temperature signal during overrun operation of said engine.

8. A method according to claim 7 wherein the inhibiting of said fuel metering signals is maintained during overrun operation below an intake air temperature from about 10° C. to 17° C.

* * * * *